United States Patent
Runyan

(10) Patent No.: US 6,806,799 B2
(45) Date of Patent: Oct. 19, 2004

(54) CIRCUIT BREAKER ASSEMBLY

(75) Inventor: Daniel J Runyan, Rodanthe, NC (US)

(73) Assignee: Square D Company, Palatine, IL (US)

( * ) Notice: Subject to any disclaimer, the term of this patent is extended or adjusted under 35 U.S.C. 154(b) by 24 days.

(21) Appl. No.: 10/334,092

(22) Filed: Dec. 31, 2002

(65) Prior Publication Data

US 2004/0125546 A1 Jul. 1, 2004

(51) Int. Cl.⁷ .......................... H01H 13/04; H01H 9/02
(52) U.S. Cl. ........................................ 335/6; 335/202
(58) Field of Search ................... 335/6, 202; 200/293, 200/294, 295

(56) References Cited

U.S. PATENT DOCUMENTS

| | | | | |
|---|---|---|---|---|
| 4,351,620 A | * | 9/1982 | Stritt et al. | 403/13 |
| 4,900,275 A | * | 2/1990 | Fasano | 439/716 |
| 4,905,122 A | * | 2/1990 | Culnan et al. | 361/673 |
| 5,047,604 A | * | 9/1991 | Grass et al. | 200/294 |
| 5,486,979 A | * | 1/1996 | Bowen et al. | 361/640 |
| 5,768,091 A | * | 6/1998 | Vinson et al. | 361/601 |

* cited by examiner

Primary Examiner—Ramon M. Barrera
(74) Attorney, Agent, or Firm—David R. Stacey; Larry T. Shrout

(57) ABSTRACT

An anti-rotation device for preventing the pivotal rotation of a circuit breaker required for removal of that circuit breaker from electrical distribution equipment in which it is installed is disclosed.

20 Claims, 4 Drawing Sheets

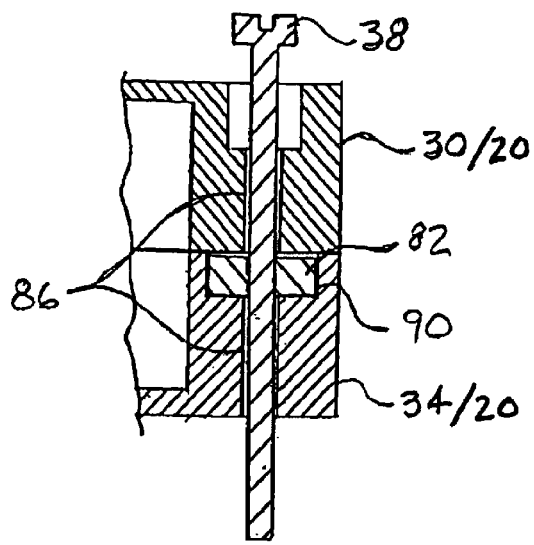
fig.4
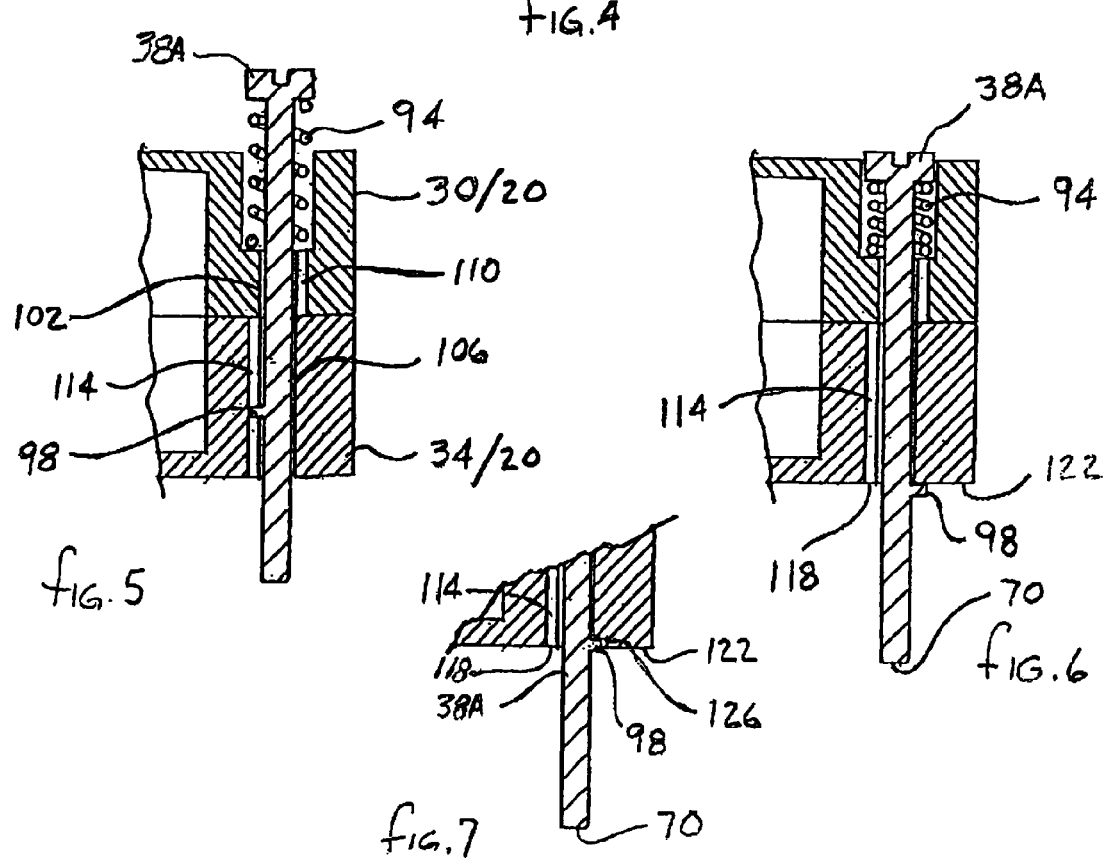
fig.5
fig.6
fig.7

CIRCUIT BREAKER ASSEMBLY

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to the field of electrical distribution, and particularly to back fed circuit breakers.

BRIEF DESCRIPTION OF THE DRAWINGS

The features of the invention will become more clearly understood from the following detailed description of the invention read together with the drawings in which:

FIG. 4 is a cutaway detail of the anti-rotation device.

FIG. 5 is a cutaway detail of an alternate construction of the anti-rotation device in the install/remove position.

FIG. 6 is a cutaway detail of the alternate construction of FIG. 5 in the anti-rotation position.

FIG. 7 is a cutaway detail of the alternate construction of FIG. 5 in a second embodiment of the anti-rotation position.

Figure 1:
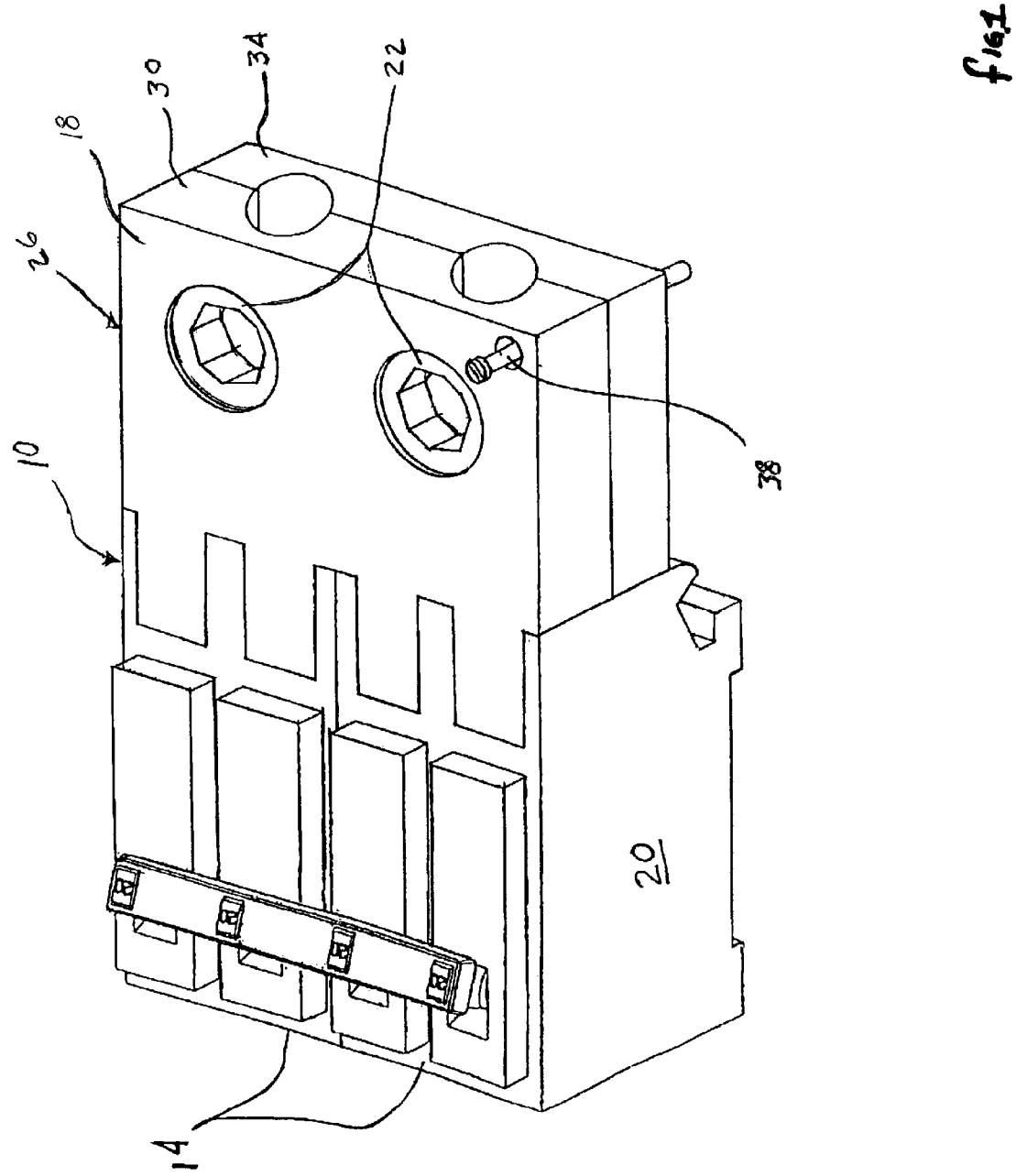
FIG. 1 illustrates a circuit breaker assembly manufactured in accordance with the present invention.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates a plug-in circuit breaker assembly 10 manufactured in accordance with the present invention. The circuit breaker assembly 10 includes one or more plug-in circuit breakers 14 (two shown) as known in the industry and a lug pack 18. The circuit breaker 14 has a molded case 20 which supports and protects the electrical and mechanical components of the circuit breaker 14. The lug pack 18 includes load terminal lugs 22 and associated busing (not shown) connecting the lugs 22 to the load side of the circuit breakers 14. The lugs 22 and busing are enclosed within a housing 26 having an upper part 30 and a lower part 34. A circuit breaker assembly 10 is typically installed in a panelboard, load center or similar type of electrical distribution equipment for back feeding the electrical distribution equipment from a second power source. Current electrical codes (2002 NEC article 408–16(f)) require that a circuit breaker used for this purpose "shall be secured in place by an additional fastener that requires other than a pull to release the device from the mounting means". Generally, this means a tool is required for removal of the circuit breaker assembly 10. Typically, only one or two circuit breaker positions in the electrical distribution equipment are provided with specific features which interact with a feature provided on the circuit breaker such that something other than a pull (e.g. a tool) is required to remove the circuit breaker. The circuit breaker assembly 10 of the present invention is provided with an anti-rotation device 38, which does not require any special features in the electrical distribution equipment and therefore can be used at any circuit breaker location provided in the electrical distribution equipment to meet the code requirements. The anti-rotation device 38 requires the use of a tool for movement between a first or install/remove position and a second or anti-rotation position that prevents removal of the circuit breaker assembly 10 from the electrical distribution equipment.

Figure 2:
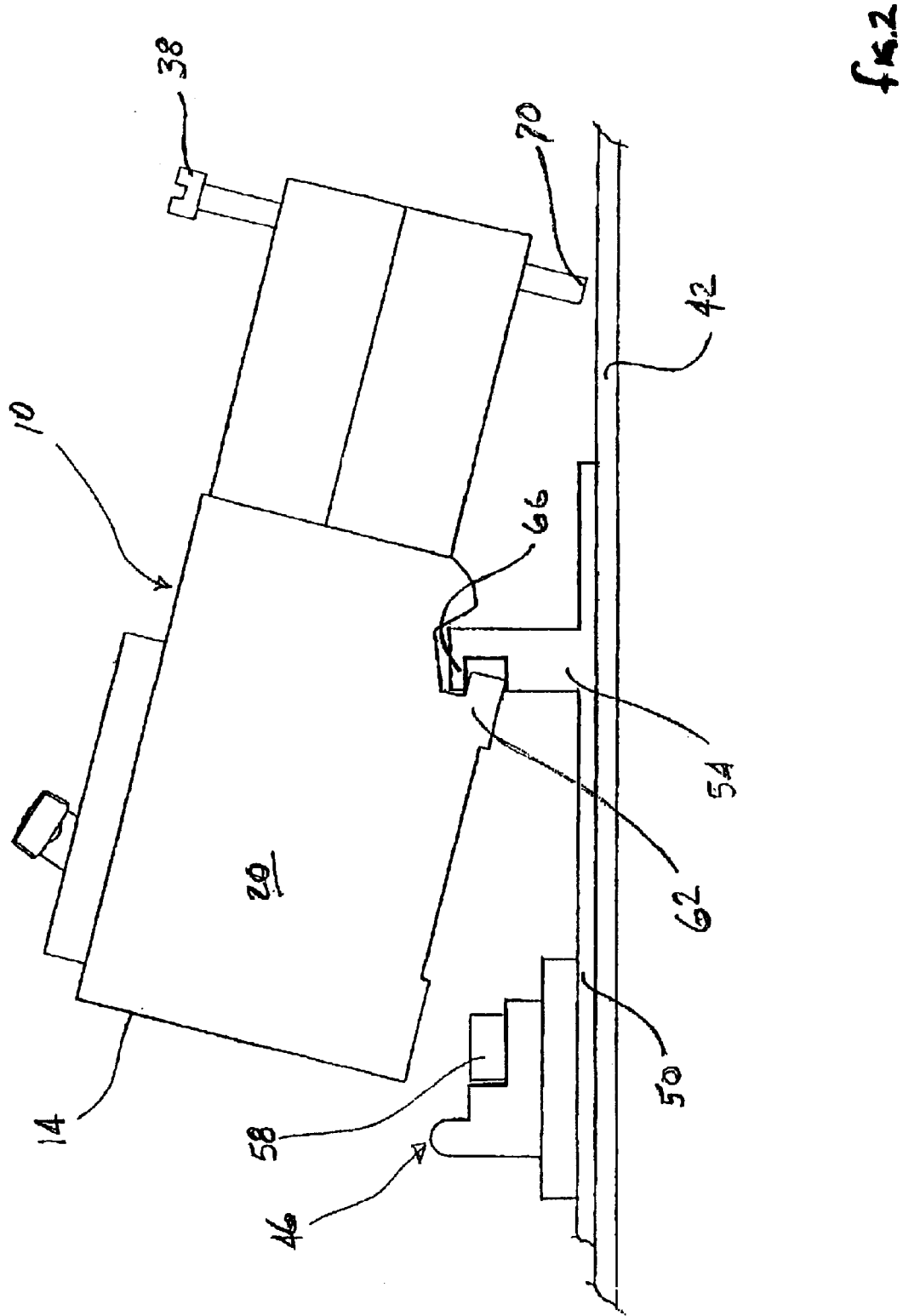
FIG. 2 illustrates the circuit breaker assembly of FIG. 1 with components of a load center, the circuit breaker assembly in a preinstalled position with the anti-rotation device retracted.
Figure 3:
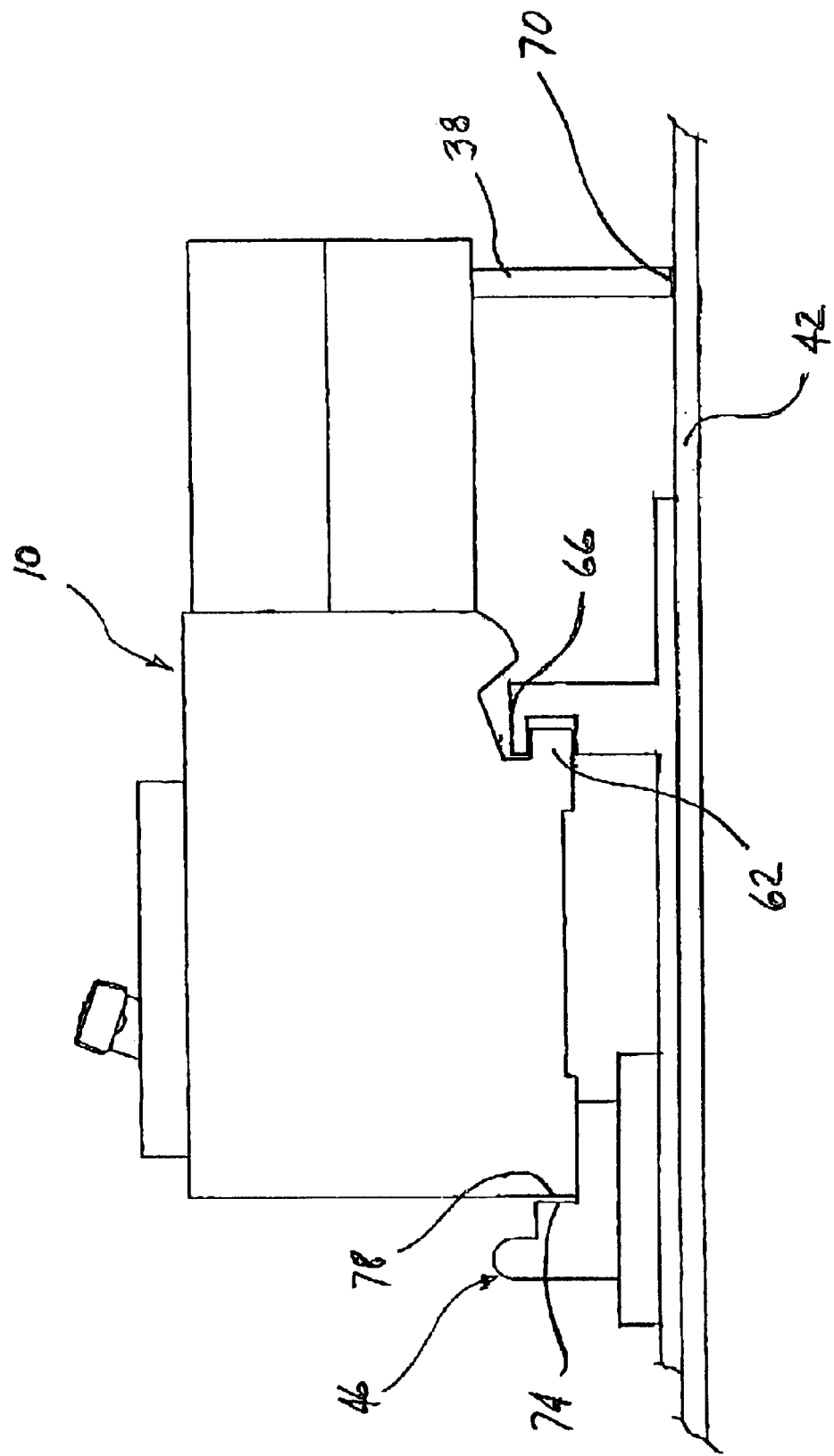
FIG. 3 illustrates the circuit breaker assembly of FIG. 1 with components of a load center, the circuit breaker assembly in an installed position with the anti-rotation device extended.

FIGS. 2 and 3 illustrate a plug-in circuit breaker assembly 10 being installed in a piece of electrical distribution equipment, such as a load center, that includes an enclosure with a rear surface 42 and an interior assembly 46 mounted on the rear surface 42. FIG. 2 illustrates the circuit breaker assembly 10 in a pre-installed position. The interior assembly 46 includes an integrally formed base 50 and mounting rail 54, and at least one electrical bus (not shown) supported and protected by the base 50. The electrical bus includes a circuit breaker stab 58 at each circuit breaker position. The stabs 58 provide the electrical connection for the circuit breakers 14. The circuit breaker assembly 10 is installed by inserting a mounting cam 62, defined by the circuit breaker case 20, into a locking feature 66, defined by the mounting rail 54. The circuit breaker assembly 10 must be positioned at an angle, with respect to the rear surface 42 of the electrical distribution equipment, sufficient to permit the mounting cam 62 to be inserted into the locking feature 66. The circuit breaker assembly 10 can then be rotated about the mounting cam 62 to an installed position (FIG. 3). During the installation and any subsequent removal of the circuit breaker assembly 10, the anti-rotation device 38 must be in the first position. In the first position, the anti-rotation device 38 is retracted such that a distal end 70 of the anti-rotation device 38 is sufficiently spaced from the rear surface 42 of the electrical distribution equipment to permit the angled pre-installed position of FIG. 2.

FIG. 3 illustrates the circuit breaker assembly 10 in the installed position. From the pre-installed position of FIG. 2, the circuit breaker assembly 10 is rotated about the mounting cam 62 until the line contact (not shown) of the circuit breaker 14 is fully installed on the circuit breaker stab 58. In the installed position, the circuit breaker assembly 10 is generally parallel to the rear surface 42 of the electrical distribution equipment and the mounting cam 62 is fully received in the locking feature 66. A surface 74 of the interior assembly base 50 is immediately adjacent an end wall 78 of the circuit breaker 14 such that lateral movement of the breaker 14 is limited, thus preventing the mounting cam 62 from being disengaged from the locking feature 66 of the mounting rail 54. In the installed position, the anti-rotation device can be moved to the second position where it extended such that its distal end 70 engages, or is in sufficient proximity to the rear surface 42 of the electrical distribution equipment. This prevents a rotation of the circuit breaker assembly 10 about the mounting cam 62 sufficient for the mounting cam 62 to be disengaged from the locking feature 66. Since the anti-rotation device 38 does not require permanent engagement with any feature of the electrical distribution equipment to prevent removal of the circuit breaker assembly 10, it can be used at any circuit breaker location in the equipment. Further, it can be used in existing electrical distribution equipment that has circuit breakers 14 and interior assemblies 46, which employ mounting cams 62 and locking features 66 that cooperate in the same general manner as described above.

FIG. 4 illustrates a first embodiment of the anti-rotation device 38 in which movement between the first and second positions is accomplished by thread engagement between a threaded portion of the anti-rotation device 38 and a captivated female threaded element, such as a nut 82. In this embodiment, a passage 86 for receiving the anti-rotation device 38 is defined in the upper and lower parts, 30 and 34, respectively, of the lug pack housing 26. One of the upper or lower parts, 30 and 34, respectively, further defines a void 90 coaxially positioned with respect to the passage 82 for captively receiving the nut 82. The anti-rotation device 38 is rotated by using a screwdriver or similar tool for movement between its first and second positions.

FIG. 5 illustrates a second embodiment of the anti-rotation device 38A in its first position. In this embodiment, the first position of the anti-rotation device 38A is determined by a biasing means 94 and the second position is determined by a fixed feature, such as a nub 98 located on the anti-rotation device 38A. The location of the nub 98 on the anti-rotation device 38A is predetermined such that the distal end 70 of the anti-rotation device 38A, when in its second position, will be maintained in sufficient proximity to the rear surface 42 of the electrical distribution equipment to prevent sufficient rotation of the circuit breaker assembly 10 about the mounting cam 62 for removal of the circuit breaker assembly 10. Axially aligned passages, 102 and 106, for receiving the anti-rotation device 38A, are defined in the upper and lower parts, 30 and 34, respectively, of the lug pack housing 26. Passage 102 further defines a keyway 110, and passage 106 further defines a keyway 114 for slidably receiving the nub 98. Keyway 110 of passage 102 is offset from keyway 114 of passage 106, such that, during assembly, the nub 98 can be captivated in keyway 114. As long as the nub 98 is located in keyway 114, the biasing means 94 will maintain the anti-rotation device 38A in its first position, as shown in FIG. 2.

FIG. 6 illustrates the second embodiment of the anti-rotation device 38A in its second position. After the circuit breaker assembly 10 is in the installed position as shown in FIG. 2, a tool such as a screwdriver can be used to insert the anti-rotation device 38A into the passage 102/106 until the nub 98 clears a distal end 118 of the keyway 114. The anti-rotation device 38A is then rotated such that the nub 98 is angularly displaced from the distal end 118 of the keyway 114 and can not reenter the keyway 114. In the second position, the nub 98 is biased against a surface 122 of the lug pack enclosure 26 by the biasing means 94. A groove 126 (shown in FIG. 7), angularly displaced from the distal end 118 of the keyway 114, can also be provided in the surface 122 for receiving the nub 98 and preventing unintentional rotation of the anti-rotation device 38A.

Although the description of the anti-rotation device 38/38A has been described with respect to the lug pack 18 of the circuit breaker assembly 10, it can be incorporated into the molded case 20 of the circuit breaker 14.

I claim:

1. A plug-in circuit breaker assembly comprising: at least one plug-in type circuit breaker;
    a lug pack connected to a load end of said at least one plug-in type circuit breaker;
    an anti-rotation device operatively connected to said lug pack for selectively permitting or preventing a pivotal rotation of said circuit assembly required for removal from an electrical distribution equipment in which said circuit breaker assembly is installed.

2. The plug-in circuit breaker assembly of claim 1, wherein said anti-rotation device has first and second selectable positions.

3. The plug-in circuit breaker assembly of claim 2, wherein said first selectable position permits said pivotal rotation of said plug-in circuit breaker assembly for installation and removal of said plug-in circuit breaker assembly in said electrical distribution equipment.

4. The plug-in circuit breaker assembly of claim 2, wherein said second selectable position prohibits said pivotal rotation of said plug-in circuit breaker assembly thereby preventing removal from its installed position.

5. The plug-in circuit breaker assembly of claim 2, wherein in said first selectable position said anti-rotation device is retracted.

6. The plug-in circuit breaker assembly of claim 2, wherein in said second selectable position said anti-rotation device is extended such that a distal end of said anti-rotation device engages a portion of said electrical distribution equipment when said pivotal rotation required for removal of said plug-in circuit breaker assembly is attempted.

7. The plug-in circuit breaker assembly of claim 2, wherein in said anti-rotation device includes a threaded portion received in a threaded device of said plug-in circuit breaker assembly such that movement between said first and second positions is accomplished by rotating said anti-rotation device.

8. The plug-in circuit breaker assembly of claim 2, wherein in said anti-rotation device is slidably received within a passage defined in said plug-in circuit breaker assembly and biased to said first position.

9. The plug-in circuit breaker assembly of claim 8, wherein said passage further defines a keyway for slidably receiving a nub extending outwardly from said anti-rotation device at a predetermined location.

10. The plug-in circuit breaker assembly of claim 9, wherein movement from said first position to said second positions is accomplished by pushing said anti-rotation device into said passage until said nub exits a distal end of said keyway and rotating said anti-rotation device such that said nub is angularly displaced from said distal end of said keyway, said biasing means maintaining said ant-rotation device in said second position.

11. The plug-in circuit breaker assembly of claim 10, wherein said surface of said plug-in circuit breaker assembly further defines a groove for receiving said nub.

12. A plug-in circuit breaker assembly installed in electrical distribution equipment by pivotal rotation, said circuit breaker assembly comprising:
    at least one plug-in type circuit breaker;
    a lug pack connected to a load end of said at least one plug-in circuit breaker;
    an anti-rotation device operatively attached to said lug pack for selective movement between a first position and a second position.

13. The plug-in circuit breaker assembly of claim 12, wherein said first position of said anti-rotation device permits said pivotal rotation of said circuit breaker assembly required for installation and removal of said circuit breaker assembly in said electrical distribution equipment.

14. The plug-in circuit breaker assembly of claim 13, wherein in said first position said anti-rotation device is retracted.

15. The plug-in circuit breaker assembly of claim 12, wherein said second position of said anti-rotation device prohibits said pivotal rotation of said circuit breaker assembly required for removal from said electrical distribution equipment.

16. The plug-in circuit breaker assembly of claim 15, wherein in said second position said anti-rotation device is extended such that a distal end of said anti-rotation device engages a portion of said electrical distribution equipment when said pivotal rotation required for removal of said plug-in circuit breaker assembly is attempted.

17. A plug-in circuit breaker assembly installed in electrical distribution equipment by pivotal rotation about a mounting rail fixed to a surface of the electrical distribution equipment, said circuit breaker assembly comprising:

at least one plug-in type circuit breaker defining a mounting cam, said cam pivotally engaging said mounting rail;

a lug pack connected to a load end of said at least one plug-in circuit breaker;

an anti-rotation device having a distal end and being operatively attached to said lug pack for selective movement between a retracted position and an extended position.

18. The plug-in circuit breaker assembly of claim 17, wherein in said retracted position said distal end of said anti-rotation device is sufficiently spaced from said surface of the electrical distribution equipment to permit said pivotal rotation of said circuit breaker assembly required for installation and removal.

19. The plug-in circuit breaker assembly of claim 17, wherein in said second position said distal end of said anti-rotation device is in sufficient proximity to said surface of the electrical distribution equipment that said distal end of said anti-rotation device engages said surface of said electrical distribution equipment when said pivotal rotation required for removal of said circuit breaker assembly is attempted.

20. A plug-in circuit breaker installed in electrical distribution equipment by pivotal rotation about a mounting rail fixed to a surface of the electrical distribution equipment, said circuit breaker comprising:

a circuit breaker case for supporting and protecting electrical and mechanical components of said circuit breaker;

a mounting cam defined by said case pivotally engaging said mounting rail;

an anti-rotation device having a distal end and being operatively attached to said circuit breaker case for selective movement between a retracted position wherein said distal end of said anti-rotation device is sufficiently spaced from said surface of the electrical distribution equipment to permit said pivotal rotation of said circuit breaker required for installation and removal and an extended position wherein said distal end of said anti-rotation device is in sufficient proximity to said surface of the electrical distribution equipment that said distal end of said anti-rotation device engages said surface of said electrical distribution equipment when said pivotal rotation required for removal of said circuit breaker is attempted.

* * * * *